Sept. 13, 1932.  W. S. CALCOTT ET AL  1,876,857
PROCESS OF MAKING POLYMERS OF ACETYLENE
Filed Sept. 1, 1928
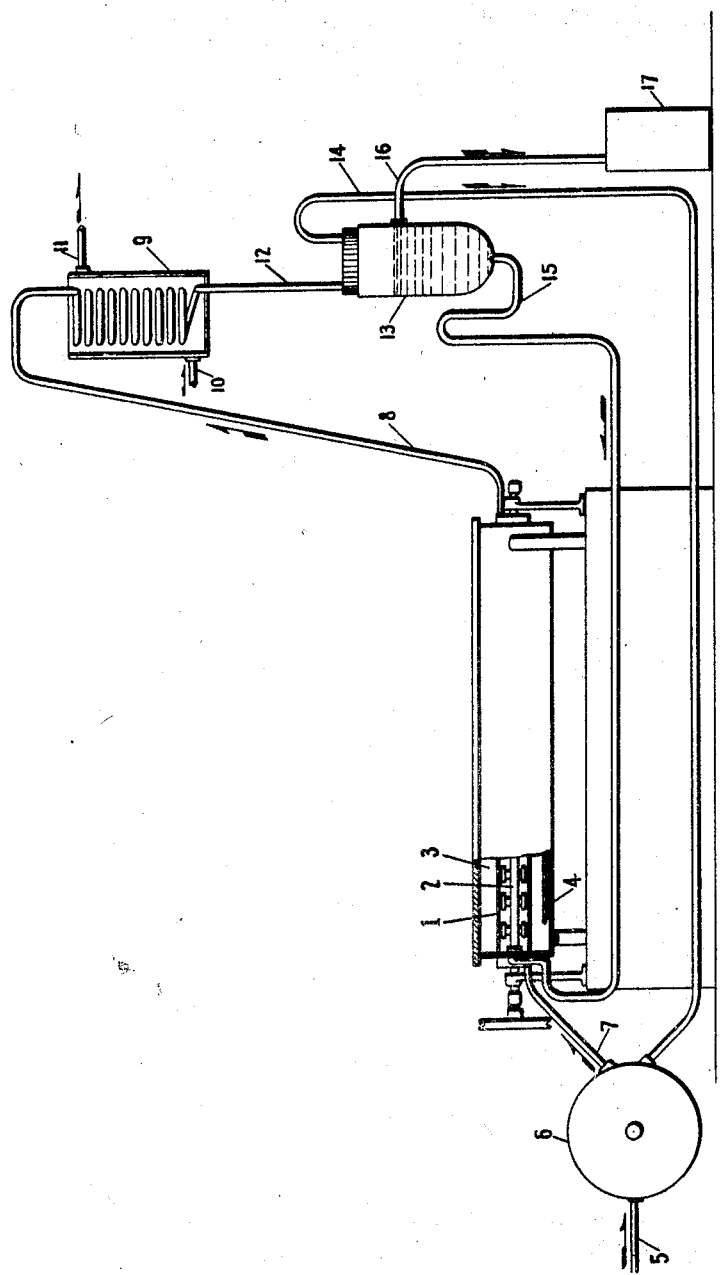
William S. Calcott
Frederick B. Downing   Inventors
By his attorney Patented Sept. 13, 1932

1,876,857

UNITED STATES PATENT OFFICE

WILLIAM S. CALCOTT, OF PENNS GROVE, AND FREDERICK B. DOWNING, OF CARNEYS POINT, NEW JERSEY, ASSIGNORS TO E. I. DU PONT DE NEMOURS & COMPANY, OF WILMINGTON, DELAWARE, A CORPORATION OF DELAWARE

PROCESS OF MAKING POLYMERS OF ACETYLENE

Application filed September 1, 1928. Serial No. 303,494.

This invention relates to improvements in the production from acetylene of highly unsaturated hydrocarbons of higher molecular weight.

It is known that by passing acetylene into a mixture of ammonium chloride, water, cuprous chloride and copper powder, unsaturated hydrocarbons of higher molecular weight are formed and may be obtained by distilling them from the mixture. This process is disclosed in Patent No. 1,811,959, granted to Julius A. Nieuwland, June 30, 1931, as a continuation of application Serial No. 153,210, filed December 7, 1926. The water driven over during the distillation process is returned to the cataylst mixture which is then ready for retreatment with acetylene. The major product is a low boiling (80 to 85° C.), highly unsaturated oil called divinyl acetylene and having the empirical formula $C_6H_6$. Small amounts of higher and lower boiling unsaturated oils are also obtained which result from the polymerization or further reaction of the low boiling product. Among these unsaturated oils may be mentioned a polymer having most probably the empirical formula $C_8H_8$ and, therefore, a tetramer of acetylene, and a polymer having the formula $C_4H_4$ which has been definitely established to comprise monovinyl acetylene.

This invention has as an object the production from acetylene of highly unsaturated hydrocarbons of higher molecular weight by a continuous process. A further object is to avoid contamination of the catalyst in the above mentioned process. Other objects will appear hereinafter. These objects are accomplished by carrying out the process in the manner hereinafter described, which is adapt for continuous operation.

While the process may be successfully operated in a number of ways which fall with in the scope of our invention, and while the particular type of apparatus employed is of slight importance, for purposes of illustration an arrangement of apparatus suitable for carrying out the process, together with an actual embodiment of the process as carried out therein, are described below.

The single figure of the drawing shows a diagrammatic view of the apparatus.

In the drawing, 1 is a tube, preferably of Pyrex, having a paddle agitator 2 extending through it. The tube 1 rests in a water bath 3, heated by the electric heater 4. Pure acetylene is passed through connection 5 into circulating blower 6 and through connection 7 into the tube 1. Connection 8 leads from the outlet end of tube 1 to the condenser 9. The condenser 9 is cooled by ice water which enters at 10 and leaves at 11. Connection 12 leads from the condenser 9 to the separator 13. Connection 14 leads from the separator 13 back to the blower 6; connection 15 leads from the separator 13 back to the inlet end of the tube 1 and connection 16 leads from the separator 13 to the container 17.

1,000 g. of cuprous chloride, 50 g. of copper powder and 326 g. of ammonium chloride are thoroughly mixed with 450 g. of distilled water and the mixture placed in the tube 1. This mixture is stirred by the paddle agitator 2 extending through the tube 1. The above mentioned catalyst is then heated to 50° C. by means of the water bath 3 in which the tube 1 is mounted. Pure acetylene is passed through connection 5, circulating blower 6, connection 7 and into and through tube 1. The emerging gases are led through connection 8 to condenser 9 which is cooled by ice water, the ice water entering at 10 and leaving at 11. The water and oily products are condensed and fall through connection 12 into separator 13. The water is automatically returned through connection 15 to the catalyst at the gas inlet end of tube 1 while the oily products overflow through connection 16 into a separate container 17. The unreacted acetylene passes from the separator 13 through the connection 14 into the circulating blower 6 which returns it through connection 7 to the inlet end of tube 1 mixing it with the fresh supply of acetylene. When the gas circulation rate is held slightly above the point necessary to cause the reaction of 8 to 9 liters of acetylene per hour, there will be produced, as soon as all cupric copper is reduced, (4 to 8 hours operation), a quantitative yield of unsaturated oily products.

We have found that the amount of unreacted acetylene in the catalyst mixture increases with the acetylene pressure over the catalyst and decreases with rise in temperature of the catalyst; the rate of formation of the acetylene polymers, particularly the higher polymers of divinyl acetylene, increases with rise in temperature and with the concentration of acetylene in the catalyst mixture, while the resulting polymers even in concentrations below 1% of the catalyst by weight, exercise a vapor pressure not more than 10% below the vapor pressure of the separated oils at the same temperature. When, therefore, acetylene is passed over the agitated catalyst mixture at slightly elevated temperatures, for example 50° C., the emerging gases contain acetylene, the unsaturated oily products largely boiling it from 80 to 85° C. and water vapor. The oily products and the water are condensed from the acetylene which is recirculated over the catalyst. The water is returned to the reaction and the unsaturated oils drawn off for use. The operating conditions, such as rate of circulation of acetylene over the catalyst, and the degree of agitation of the catalyst mixture, are governed by the size and shape of the catalyst chamber and particularly by the temperature and acetylene pressure at which it is desired to operate the production cycle. Catalyst temperatures from 45° C. to 100° C. may be used, but for the introduction of acetylene at atmospheric pressure, a catalyst temperature of 50° C. gives best results. It is necessary, according to the invention, to circulate the gases over the catalyst at a rate sufficient to carry off substantially all the unsaturated oily products before non-volatile or resinous products are entrained in the reaction system. Higher circulation rates are not injurious but are merely thermally inefficient.

By the process hitherto known and in use, the catalyst mixture is subjected to a varied and time consuming cycle not well adapted to large scale production and accompanied by the gradual accumulation of non-volatile, resinous polymers which impair the activity and shorten the life of the catalyst. By the continuous process herein disclosed, the oily products may be removed at such a rapid rate that no non-volatile products are formed in the catalyst. Substantially theoretical yields of unsaturated oils are obtained from the acetylene and catalyst contamination is reduced to a negligible value. Obviously any catalyst adapted to promote the formation of non-benzenoid polymers of acetylene, including the type of catalyst described in the Nieuwland patent, may be employed. In preparing the catalyst, the proportions described in the example need not be adhered to rigidly. It is desirable for optimum results that the amount of ammonium chloride used be sufficient to effect substantially complete saturation of the liquid phase and that the cuprous chloride be more than sufficient for complete saturation. These conditions, however, are not essential. The hydrochloric acid may be the ordinary concentrated aqueous solution or may be richer in hydrochloric acid. The function of the copper powder is merely to insure that all of the combined copper is present in the cuprous form, as cupric copper causes undesirable side reactions. Cupric copper is, therefore, best reduced with copper before starting.

Equivalents may be used for the reagents named, as for example, a mixture of cupric chloride and a reducing agent may be substituted for cuprous chloride and other ammonium salts may be used instead of ammonium chloride or even a cyclic nitrogen base such as pyridine. Upon the admixture of such ammonium compounds with the cuprous chloride solution, due to ionization, substantial amounts of ammonium chloride or of the hydrochloride of the tertiary amine will necessarily be formed.

As many apparently widely different embodiments of this invention may be made without departing from the spirit and scope thereof, it is to be understood that I do not limit myself to the specific embodiments thereof except as defined in the appended claims.

We claim:

1. In a process for the continuous production of acetylene polymers, the steps which comprise continuously passing acetylene into contact with a heated acid reacting cuprous chloride catalyst adapted to promote the polymerization and continuously removing the products of the reaction.

2. In a process for the continuous production of acetylene polymers, the steps which comprise continuously passing acetylene into contacts with a heated acid reacting cuprous chloride catalyst adapted to promote the polymerization, continuously removing the unreacted acetylene together with the volatile products of the reaction, condensing said products, separating the unreacted acetylene from the acetylene polymers and returning said unreacted acetylene to the reaction.

3. The process of claim 2 in which the catalyst is an equeous acid reacting mixture containing cuprous chloride is maintained at a temperature of from 45° to 100° C.

4. The process of claim 2 in which the catalyst is an equeous acid reacting mixture containing cuprous chloride is maintained at a temperature of 50° C. and the acetylene is introduced at substantially atmospheric pressure.

5. The process of claim 1, wherein the catalyst comprises an acid reacting aqueous cuprous chloride solution.

6. The process of claim 1, in which the catalyst is an aqueous mixture of cuprous chloride, metallic copper and ammonium chloride.

7. The process of claim 1, in which the catalyst is an aqueous mixture of cuprous chloride, metallic copper, and ammonium chloride maintained at a temperature of from 45° to 100° C.

8. The process of producing volatile acetylene polymers which comprises passing acetylene into and out of contact with a heated acid reacting cuprous chloride catalyst adapted to promote its polymerization, the rate of passage of the acetylene being such that the polymers are removed from the catalyst substantially as fast as formed.

9. The process of producing volatile acetylene polymers which comprises passing a stream of acetylene into and out of contact with an aqueous mixture of cuprous chloride, metallic copper, and ammonium chloride maintained at a temperature of from 45° to 100° C., the rate of passage of the acetylene being such that the volatile products of the reaction are removed substantially as fast as formed.

10. The cyclic process of producing volatile acetylene polymers which comprises passing acetylene in a continuous stream into contact with a heated acid reacting cuprous chloride catalyst adapted to promote the formation of said polymers, the rate of passage of the acetylene being such that the volatile polymers are absorbed substantially as fast as formed, continuously removing the polymers together with the unreacted acetylene, continuously separating the polymers from the acetylene, and continuously returning the latter to the reaction.

11. The process of claim 10, in which the catalyst comprises cuprous chloride, maintained at about 50° C. and the acetylene is introduced at substantially atmospheric pressure.

12. In the known process of producing acetylene polymers which comprises passing acetylene over an acid reacting cuprous chloride catalyst adapted to promote its polymerization, the step of sweeping the polymers away from the reaction zone as they are formed by means of an excess of acetylene.

13. In the known process of producing acetylene polymers which comprises passing acetylene into contact with an aqueous acid reacting saturated solution of cuprous chloride and an ammonium compound of the class consisting of ammonium salts and pyridine, the step of removing the polymers from the catalyst substantially as fast as they are formed.

14. An acetylene polymer mixture obtained by passing acetylene in a continuous stream into contact with a heated acid reacting aqueous solution of cuprous chloride and ammonium chloride, continuously removing the volatile products of the reaction substantially as fast as formed together with the unreacted acetylene and separating the polymers by condensation from the acetylene.

15. The process of claim 13 wherein the catalyst is prepared from substantially 1000 parts of cuprous chloride, substantially 50 parts of copper powder, substantially 326 parts of ammonium chloride and 450 parts of distilled water.

16. In a process for the production of volatile non-benzenoid acetylene polymers, the method which comprises the known step of passing the acetylene into contact with a heated polymerization catalyst adapted to form non-benzenoid reaction products with a boiling point higher than the temperature of the reaction zone, in combination with the step of passing a stream of the acetylene through the reaction zone at such a rate as to carry off the reaction products substantially as fast as formed.

17. The process of claim 16 wherein the catalyst is heated to a temperature of substantially 50° C.

In testimony whereof we affix our signatures.

WILLIAM S. CALCOTT.
FREDERICK B. DOWNING.